Dec. 6, 1938.  D. C. DOBBINS  2,139,070
RAILWAY CAR WHEEL
Filed Sept. 28, 1933

Inventor
DONALD C. DOBBINS
By Emery, Booth, Varney & Holcomb
his Attorneys.

Patented Dec. 6, 1938

2,139,070

UNITED STATES PATENT OFFICE 2,139,070

RAILWAY CAR WHEEL

Donald C. Dobbins, Champaign, Ill.

Application September 28, 1933, Serial No. 691,389

16 Claims. (Cl. 295—3)

The present invention relates to wheels of railway rolling stock and the like and aims generally to improve existing wheels of that type.

Among the more important objects of my invention is the provision of a suitable continuous trackway for ordinary pneumatic tires, such as are commonly used on road wheels, which trackway is adapted to run and be guided upon the rails of railroad trackways.

Other important objects and advantages will appear from a consideration of the following specification and claims, reference being had to the accompanying drawing which is illustrative of a preferred embodiment of the invention, and in which Fig. 1 is a side elevation of a railway wheel according to my invention;

Figure 1:
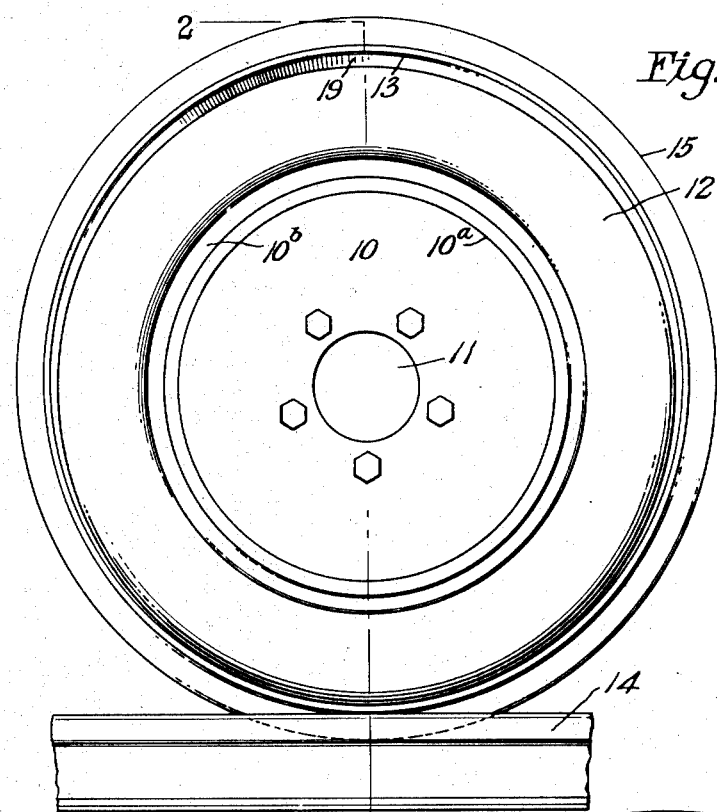

According to my invention, the wheel comprises pneumatic tire carriers 10, connected to the hub 11 of the wheel, said carriers having pneumatic tires 12 demountably secured thereto. The tires 12 provide a resilient wheel support for the railway car and are adapted to roll along a continuous annular track 13, loosely surrounding the tires and running upon the railway track rails 14, being guided thereon by a rail flange 15.

Figures 2, 4:
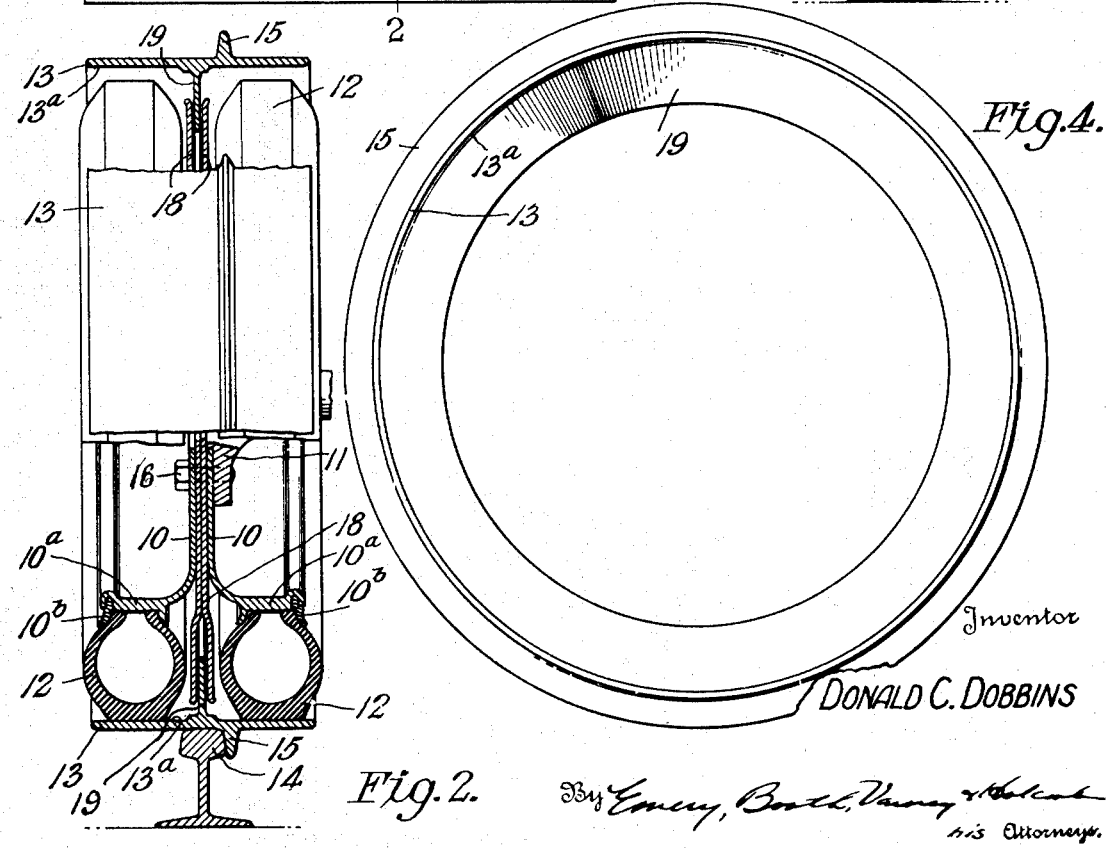
Fig. 2 is a vertical sectional elevation taken on the line 2—2 of Fig. 1, illustrating one embodiment of my invention employing a dual tired wheel.
Fig. 4 is an elevation of the annular trackway.

In utilizing my invention in connection with double tired wheels, as illustrated in Fig. 2, separate tire carriers 10 are provided, one for each tire 12, the carriers 10 being securely fastened to the hub portion 11 of the wheel by any suitable or conventional means, as by bolts 16. The carriers 10 may advantageously be in the form of discs, provided with a tire retaining rim 10$^a$ for the reception of a conventional pneumatic tire 12 which may be held in place thereon by means of the usual split tire ring 10$^b$.

The annular track 13 may advantageously be circular in form and constructed of steel, and preferably is of greater diameter than the outside diameter of the tires. The track 13 is provided with a broad face 13$^a$ providing adequate traction surface for both tires 12, and along the outer circumference is provided with an annular rail flange 15 guiding the track relatively to the rails 14 along which it rolls.

According to my invention, means are provided for guiding and maintaining the track 13 in position relative to the wheel, and in the illustrated form of the invention, such guide means may take the form of a pair of opposed guide discs or plates 18 rigidly secured to the hub 11, as by being clamped between the tire carriers 10 (Fig. 2). The outer peripheral portion of the guide discs or plates 18 are spaced apart to loosely receive an internal guide flange 19 on the track 13 and thus prevent axial shifting of the track 13 relative to the tires 12 and at the same time permit free relative circumferential movement relative thereto.

Figure 3:
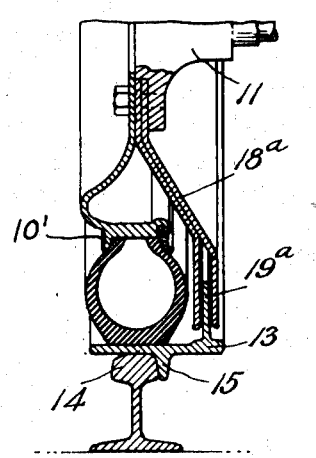
Fig. 3 is a fragmentary vertical sectional view of a wheel utilizing a single pneumatic tire.

In Fig. 3 I have illustrated the adaptability of my invention to a single tired wheel. In this instance the guide discs or plates 18$^a$ may be secured to the hub between the tire carrier 10' and the hub. The discs 18$^a$ are advantageously formed with laterally offset inner and outer marginal edge portions, the outer marginal edges of the plates being spaced to provide a loose guide, interiorly of the tire, for the reception of an internal guide flange 19$^a$ adjacent one marginal edge of the track 13.

It will be observed that as the track 13 loosely surrounds the tires and is of larger diameter, it will, in use, be eccentric to the tires, and the driving force between the tire and track is of the internal friction gear type. The load of the railway car transmitted through the tires 13 is axial of or is balanced in parallelism with the rail. In the event of complete deflation of the pneumatic tires, the wheel will not be rendered inoperative because the flanges 18 will, in such event, roll upon the annular trackway 13.

Advantages of my invention are the provision of a broad flat, freely floating trackway surface making dual pneumatically tired wheels adaptable to railway track usage; which in conjunction with the internal guiding means relieves the tires of all undue side thrust. Inasmuch as the pneumatic tires will be compressed, under load, a greater traction surface is provided with the annular trackway, than would be possible with a horizontal flat track. Further, the invention invokes simplicity of construction with ease of operation. Although the invention is primarily adaptable for use with wheels embodying pneumatic tires, it is obvious to those skilled in the art to which the invention relates that it is equally applicable to wheels embodying solid rubber tires.

Without intending in any way to limit the scope of my invention to the illustrated form shown and described, I claim:

1. A vehicle wheel comprising a hub, a tire carrier secured to said hub portion, a pneumatic tire carried by said carrier, and an annular tread member surrounding the tire providing on its inside surface a continuous flat treadway of greater circumference than the tread of said tire along which said tire may roll, guideway means connected to the hub portion of the wheel and cooperating with a portion of the tread loosely supporting and guiding the tread member relative to said tire so that it is free to roll relative to said tire without frictional contact with the side walls thereof, said guideway means having continuous annular engagement with the portions of the tread, and means on the outer surface of said tread for cooperation with a railway track rail, said guideway means being rigidly connected to the hub portion and separable from the tire carrier whereby said tire may be removed from the carrier independently of the guideway means.

2. A vehicle wheel comprising a hub, a tire carrier secured to said hub portion, a pneumatic tire carried by said carrier, and an annular tread member loosely surrounding the tire, said tread member being of greater internal diameter than the outside diameter of said tire and providing on its inside surface a continuous flat treadway of greater circumference than the tread of said tire along which said tire may roll, guide means connected to the hub portion of the wheel for cooperation with a portion of the tread for maintaining said tire and wheel against lateral displacement, said guideway means having continuous annular engagement with the portions of the tread, and means on the outer surface of said tread for cooperation with a railway track rail, said guideway means being rigidly connected to the hub portion and separable from the tire carrier whereby said tire may be removed from the carrier independently of the guideway means.

3. A vehicle wheel comprising a hub, a tire carrier secured to said hub portion, a resilient tire carried by said carrier, and an annular tread member loosely surrounding the tire providing on its inside surface a continuous and progressive treadway of greater circumference than the tread of said tire along which said tire may roll, guideway means separable from the carrier and removed from the outer face of said tire, said guideway means having continuous annular engagement with the portions of the tread for guiding the tread member relatively to the tire and affording free unobstructed access to said tire from the outer side thereof.

4. A vehicle wheel comprising a hub, a tire carrier secured to said hub portion, a resilient tire carried by said carrier, and an annular tread member loosely surrounding the tire providing on its inside surface a continuous treadway of greater circumference than the tread of said tire along which said tire may roll, and means independent of the tire carrier for guiding said tread member, said guide means extending relatively close to said tread member for maintaining it free from frictional contact with the sides of said tire in the event of deflation of said tire, said last named means having continuous annular engagement with a portion of the tread, said guideway means being rigidly connected to the hub portion and spaced from the tire carrier whereby said tire may be removed from the carrier independently of the guideway means.

5. A vehicle wheel comprising a hub, a tire carrier secured to said hub portion, a pneumatic tire carried by said carrier, and an annular tread member loosely surrounding the tire providing on its inside surface a continuous treadway of greater circumference than the tread of said tire along which said tire may roll, and means separate from the tire carrier for guiding said tread member and maintaining it free from frictional contact with the sides of said tire in the event of side thrust on said wheel, said last named means having continuous annular engagement with a portion of the tread, said guideway means being rigidly connected to the hub portion and spaced from the tire carrier whereby said tire may be removed from the carrier independently of the guideway means.

6. A vehicle wheel comprising a hub, a tire carrier secured to said hub portion, a pneumatic tire carried by said carrier, and an annular tread member loosely surrounding the tire providing on its inside surface a continuous treadway of greater circumference than the tread of said tire along which said tire may roll, an internal flange on said tread member and spaced guide means connected to the hub portion of the wheel and located on one side of the tire engaging said flange and adapted to guide said tread relative to said tire and relieve said tire of all side thrust on said wheel, said guide means having continuous annular engagement with said internal flange.

7. A vehicle wheel comprising a hub, a guide means carried by the hub, a tire carrier carried by the hub, a pneumatic tire mounted on and removably connected to said carrier and an annular metallic rim member loosely surrounding the tire and providing a continuous flat trackway of greater circumference than the tread of said tire along which said tire may roll, and means independent of the carrier for guiding said tread member relatively to said tire and relieving said tire of contact with said tread member due to side thrust on said wheel, said guideway means having continuous annular engagement with said rim member and being rigidly connected to the hub portion and separable from the tire carrier whereby said tire may be removed from the carrier independently of the guideway means.

8. A vehicle wheel comprising a hub, a guide means carried by the hub, a tire carrier carried by the hub, a pneumatic tire mounted on the tire carrier and an annular metallic rim member loosely surrounding the tire and providing a continuous flat trackway of greater circumference than the tread of said tire along which said tire may roll, and means independent of the carrier for guiding said tire member relative to said tire and maintaining the side walls of said tire free from engagement with said tread member even on deflation of said tire, said guideway means having continuous annular engagement with said rim member and being rigidly connected to the hub portion and separable from the tire carrier whereby said tire may be removed from the carrier independently of the guideway means.

9. A vehicle wheel comprising in combination a hub, a pair of spaced tire carriers connected to said hub, a pneumatic tire removably mounted on each of said carriers and an annular tread member loosely surrounding said tires and providing a continuous tread of greater circumference than the tread of said tire along which said tire may roll, and means independent of the tire carrier out of contact with said tires for guiding said tread relatively to said tires, said guiding means having continuous annular engagement with said tread member and being rigidly connected to the hub and separable from the tire carriers whereby said tires may be removed from the carriers without disturbing the connection between the guiding means and the tread member.

10. A vehicle wheel comprising in combination a hub, a pair of spaced independently supported tire carriers connected to said hub, a pneumatic tire removably mounted on each of said carriers, and an annular tread member loosely surrounding said tires and providing a continuous tread of greater circumference than the tread of said tire along which said tire may roll, and means independent of the tire carrier out of contact with said tires and cooperating with said carriers for guiding said tread relatively to said tires, said guiding means having continuous annular engagement with said tread member, and being rigidly connected to the hub and separable from the tire carriers whereby said tires may be removed from the carriers without disturbing the connection between the guiding means and the tread member.

11. A vehicle wheel comprising a hub, a pair of spaced tire carriers connected to said hub, a pneumatic tire removably mounted on each of said carriers and an annular tread member of greater circumference than said tires loosely surrounding said tires and providing a continuous tread of greater circumference than the tread of said tire along which said tire may roll, means intermediate but out of contact with said tires for guiding said tread relatively to said tires, said means having continuous annular engagement with said tread member, and means for connecting the guide means to the hub, said guiding means being rigidly connected to the hub and separable from the tire carriers whereby said tires may be removed from the carriers without disturbing the connection between the guiding means and the tread member.

12. A vehicle wheel comprising a hub, a pair of tire carriers connected to said hub, a pneumatic tire removably mounted on each of said carriers and an annular tread member of greater circumference than said tires loosely surrounding said tires and providing a continuous tread of greater circumference than the tread of said tire along which said tire may roll, and guide means separable from the tire carrier for said tread positioned between said tires and out of contact therewith, said guiding means having continuous annular engagement with said tread member and being rigidly connected to the hub and spaced from the tire carriers whereby said tires may be removed from the carriers without disturbing the connection between the guiding means and the tread member.

13. A vehicle wheel comprising a hub, a pair of tire carriers connected to said hub, a pneumatic tire removably mounted on each of said carriers and an annular tread member of greater circumference than said tires loosely surrounding said tires and providing a continuous tread of greater circumference than the tread of said tire along which said tire may roll, guide means for said tread member, an internal flange on the tread adapted to be positioned between the tires for continuous annular engagement with the guide means for guiding the tread relative to said tires, and means for mounting the guide means independently of the carrier, said guiding means being rigidly connected to the hub and separable from the tire carriers whereby said tires may be removed from the carriers without disturbing the connection between the guiding means and the tread member.

14. In a vehicle wheel, a hub, a pneumatic tired driving wheel carried thereby, and an enlarged annular tread member loosely surrounding said driving wheel, said tread member being of greater circumference than the tread surface of said tire along which said tire may roll, said driving wheel having traction with said tread member only throughout a section thereof and means mounted on the hub member and located solely on one side of said tire for supporting and guiding said tread member.

15. In a vehicle wheel, a hub, a driving wheel carried thereby including a pneumatic tire and an enlarged annular tread member loosely surrounding said tire and providing a continuous trackway of greater circumference than the tread of said tire along which said tire may roll, said tire having traction with said trackway only throughout a section thereof, and means separable from the driving wheel located solely on one side of said tire for supporting and guiding said tread member.

16. A resilient rail car wheel comprising a wheel body, a tire rim carried by the wheel body, a pneumatic tire seated on the rim, a metallic tread ring having a rail engaging flange carried by the tire, said tread ring and tire rim each having radially extending and mutually overlapping flanges on only one side of the wheel, and an interlocking flange, spaced from and fixed with respect to one of the projecting flanges and overlapping the other projecting flange, the interlocking flange and the projecting flange to which it is fixed being axially spaced from and on opposite sides of the other projecting flange to limit axial movement between the tread ring and wheel body on either side of the normal position.

DONALD C. DOBBINS.